United States Patent
Ansai et al.

(10) Patent No.: US 11,453,804 B2
(45) Date of Patent: Sep. 27, 2022

(54) PRESSURE SENSITIVE ADHESIVE SHEET FOR BATTERIES AND LITHIUM-ION BATTERY

(71) Applicant: LINTEC CORPORATION, Tokyo (JP)

(72) Inventors: Takeshi Ansai, Tokyo (JP); Yuichi Kurata, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 207 days.

(21) Appl. No.: 16/574,282

(22) Filed: Sep. 18, 2019

(65) Prior Publication Data

US 2020/0087546 A1 Mar. 19, 2020

(30) Foreign Application Priority Data

Sep. 19, 2018 (JP) .............................. JP2018-175305

(51) Int. Cl.
- *C09J 7/38* (2018.01)
- *H01M 10/052* (2010.01)
- *H01M 50/46* (2021.01)

(52) U.S. Cl.
CPC ............. *C09J 7/38* (2018.01); *H01M 10/052* (2013.01); *H01M 50/46* (2021.01); *Y10T 428/28* (2015.01); *Y10T 428/2848* (2015.01); *Y10T 428/298* (2015.01)

(58) Field of Classification Search
None
See application file for complete search history.

(56) References Cited

U.S. PATENT DOCUMENTS

| | | | |
|---|---|---|---|
| 10,550,289 B2* | 2/2020 | Kurata | C09D 135/02 |
| 10,633,562 B2* | 4/2020 | Kurata | B32B 27/00 |
| 2018/0159136 A1 | 6/2018 | Shiozaki et al. | |
| 2020/0087545 A1* | 3/2020 | Ansai | H01M 50/538 |
| 2020/0123421 A1 | 4/2020 | Morioka | C09J 7/385 |
| 2021/0198529 A1* | 7/2021 | Ansai | C09J 7/381 |

FOREIGN PATENT DOCUMENTS

| | | |
|---|---|---|
| JP | 2011-256325 A | 12/2011 |
| JP | 2017-152372 | 8/2017 |
| JP | 2018-83904 A | 5/2018 |
| WO | 2017/038010 | 3/2017 |

OTHER PUBLICATIONS

Office Action for JP App. No. 2018-175305, dated Mar. 15, 2022 (w/ translation).

\* cited by examiner

*Primary Examiner* — Anish P Desai
(74) *Attorney, Agent, or Firm* — Greenblum & Bernstein, P.L.C.

(57) ABSTRACT

A pressure sensitive adhesive sheet for batteries that includes a base material and a pressure sensitive adhesive layer provided on one surface side of the base material and containing inorganic fine particles. When D50 and D90 are defined as a volume-based accumulated 50% particle diameter of the inorganic fine particles and a volume-based accumulated 90% particle diameter of the inorganic fine particles, respectively, in a particle size distribution of the inorganic fine particles in the pressure sensitive adhesive layer, the D50 is 0.5 μm or more and 2.8 μm or less, and the ratio of the D90 to the D50 (D90/D50) is 1.3 or more and 2.0 or less. The particle size distribution is measured by image analysis on a surface of the pressure sensitive adhesive layer opposite to the base material.

12 Claims, 3 Drawing Sheets

PRESSURE SENSITIVE ADHESIVE SHEET FOR BATTERIES AND LITHIUM-ION BATTERY

TECHNICAL FIELD

The present invention relates to a pressure sensitive adhesive sheet for batteries and a lithium-ion battery manufactured using the pressure sensitive adhesive sheet for batteries.

BACKGROUND ART

In some batteries, strip-like laminates are housed inside the batteries in a state of being wound up. Such a laminate is formed by laminating a positive electrode, a negative electrode, and separators located between the positive and negative electrodes. The positive and negative electrodes are connected to respective electrode lead-out tabs of conductors, which electrically connect the positive and negative electrodes respectively to a positive electrode terminal and a negative electrode terminal of the battery.

A pressure sensitive adhesive sheet may be used as a stopper for the above wound-up laminate and/or used for fixation of the electrode lead-out tabs to the electrodes. As such a pressure sensitive adhesive sheet, generally, a sheet composed of a base material and a pressure sensitive adhesive layer, provided on one surface of the base material is used. From a viewpoint of improving the desired performance such as insulation properties, a modified pressure sensitive adhesive sheet may be used which is configured such that an insulation layer that contains an insulating material is provided on the surface of the above base material opposite to the above pressure sensitive adhesive layer or between the above base material and the above pressure sensitive adhesive layer.

However, providing the insulation layer as described above separately from the pressure sensitive adhesive layer may lead to an increase in the manufacturing cost. In this regard, it is also tried to contain an insulating material or the like in the pressure sensitive adhesive layer thereby to improve the insulation properties of the pressure sensitive adhesive sheet without providing an additional insulation layer as described above. For example, Patent Document 1 discloses a pressure sensitive adhesive sheet in which the pressure sensitive adhesive layer contains alumina. Patent Document 2 discloses a pressure sensitive adhesive sheet m which the pressure sensitive adhesive layer contains magnesium hydroxide, alumina, magnesium oxide, aluminum hydroxide, silica, boron nitride, titanium oxide, or magnesium carbonate.

PRIOR ART DOCUMENTS

Patent Documents

[Patent Document 1] WO2017/038010
[Patent Document 2] JP2017-152372A

SUMMARY OF THE INVENTION

Problems to be Solved by the Invention

The pressure sensitive adhesive sheet comprising a base material and a pressure sensitive adhesive layer as described above may be manufactured through coating one surface of the base material with a pressure sensitive adhesive composition that is to form the pressure sensitive adhesive layer and curing a coating film thus obtained into the pressure sensitive adhesive layer. Alternatively, the above pressure sensitive adhesive sheet may be manufactured through coating one surface of a release sheet (in particular, the surface subjected to release treatment to obtain a release surface) with the above pressure sensitive adhesive composition, curing a coating film thus obtained into the pressure sensitive adhesive layer, and then transferring the pressure sensitive adhesive layer onto one surface of the base material.

The pressure sensitive adhesive sheet including a pressure sensitive adhesive layer that contains an insulating material as disclosed in Patent Documents 1 and 2 can also be manufacturing by the method as described above. In this case, one surface of the base material or release sheet is coated with a pressure sensitive adhesive composition that contains an insulating material. However, due to the pressure sensitive adhesive composition containing the insulating material, a granular or streak-like shape or an irregular shape may occur on the surface of the coating film obtained by coating with the pressure sensitive adhesive composition. Such a surface shape will remain substantially unchanged on the surface of the pressure sensitive adhesive layer formed by curing the coating film. The pressure sensitive adhesive sheer including the pressure sensitive adhesive layer having such a surface shape will have a problem in that the pressure sensitive adhesive sheet cannot exhibit desired adhesive strength to an adherend.

Moreover, in the pressure sensitive adhesive layer formed by coating with a pressure sensitive adhesive composition that contains an insulating material, an area in which the insulation properties are locally low may readily occur in the planar view. If the pressure sensitive adhesive sheet including such a pressure sensitive adhesive layer is placed between two substances with a potential difference, the above-described area of low insulation properties will preferentially become a conductor path. Thus, even when other areas exhibit sufficient insulation properties, the pressure sensitive adhesive sheet as a whole cannot achieve the desired insulation properties.

The present invention has been made in consideration of such actual circumstances and an object of the present invention is to provide a pressure sensitive adhesive sheet for batteries that is suppressed in the local deterioration of insulation properties and has a high adhesive strength. Another object of the present invention is to provide a lithium-ion battery in which the pressure sensitive adhesive sheet for batteries is used.

Means for Solving the Problems

To achieve the above objects, first, the present invention provides a pressure sensitive adhesive sheet for batteries, comprising: a base material; and a pressure sensitive adhesive layer provided on one surface side of the base material and containing inorganic fine particles, wherein when D50 and D90 are defined as a volume-based accumulated 50% particle diameter of the inorganic fine particles and a volume-based accumulated 90% particle diameter of the inorganic fine particles, respectively, in a particle size distribution of the inorganic fine particles in the pressure sensitive adhesive layer, the D50 is 0.5 µm or more and 2.3 µm or less, and a ratio of the D90 to the D50 (D90/D50) is 1.3 or more and 2.0 or less, wherein the particle size distribution is measured by image analysis on a surface of the pressure sensitive adhesive-layer opposite to the base material (Invention 1).

In the pressure sensitive adhesive sheet for batteries according to the above invention (Invention 1), the above-described D50 and D90 measured on the surface of the pressure sensitive adhesive layer, opposite to the base material (this surface may be referred to as a "pressure sensitive adhesive surface," hereinafter) satisfy the above-described relationships, so that the inorganic fine particles are in a state of existing in the pressure sensitive adhesive layer without forming cohesive bodies having a relatively large particle diameter, and the variation of the particle diameter of the inorganic fine particles in the pressure sensitive adhesive layer, is relatively small. As a result, the pressure sensitive adhesive sheet for batteries including the pressure sensitive adhesive layer is suppressed in the local deterioration of insulation properties and has a high adhesive strength.

In the above invention (Invention 1), the D90 may preferably be 1.0 μm or more and 3.3 μm or less (Invention 2).

In the above invention (Invention 1, 2), the thickness of the pressure sensitive adhesive layer may preferably be 1 μm or more and 50 μm or less (Invention 3).

In the above invention (Invention 1 to 3), the adhesive strength of the pressure sensitive adhesive sheet for batteries to an aluminum plate may preferably be 0.5 N/25 mm or more and 50 N/25 mm or less (Invention 4).

Second, the present invention provides a pressure sensitive adhesive sheet for batteries, comprising: a base material; and a pressure sensitive adhesive layer provided on one surface side of the base material and containing inorganic fine particles, wherein the pressure sensitive adhesive layer is formed of a pressure sensitive adhesive composition containing the inorganic fine particles, wherein when D50' and D90' are defined as a volume-based accumulated 50% particle diameter of the inorganic fine particles and a volume-based accumulated 90% particle diameter of the inorganic fine particles, respectively, in a particle size distribution of the inorganic fine particles in the pressure sensitive adhesive composition, the D50' is 0.1 μm or more and 2.0 μm or less, and a ratio of the D90' to the D50'(D90'/D60') is 1.5 or more and 4.0 or less, wherein the particle size distribution is measured by a laser diffraction/scattering method (Invention 5).

In the above invention (Invention 5), the particle gauge particle size of the inorganic fine particles in the pressure sensitive adhesive composition may preferably be 1 μm or more and 20 μm or less, wherein the particle gauge particle size is measured in accordance with JIS K5600-2-5: 1990 (Invention 6).

Third, the present invention provides a lithium-ion battery in which two or more conductors are fixed in a state of being in contact with each other, inside the battery using the above pressure sensitive adhesive sheet for batteries (Invention 2 to 6) (Invention 7).

Advantageous Effect of the Invention

The pressure sensitive adhesive sheet for batteries according to the present invention is suppressed in the local deterioration of insulation properties and has a high adhesive strength. The lithium-ion battery manufactured using the pressure sensitive adhesive sheet for batteries can therefore have high safety.

EMBODIMENTS FOR CARRYING OUT THE INVENTION

Hereinafter, one or more embodiments of the present, invention will be described.

<Pressure Sensitive Adhesive Sheet for Batteries>

Figure 1:
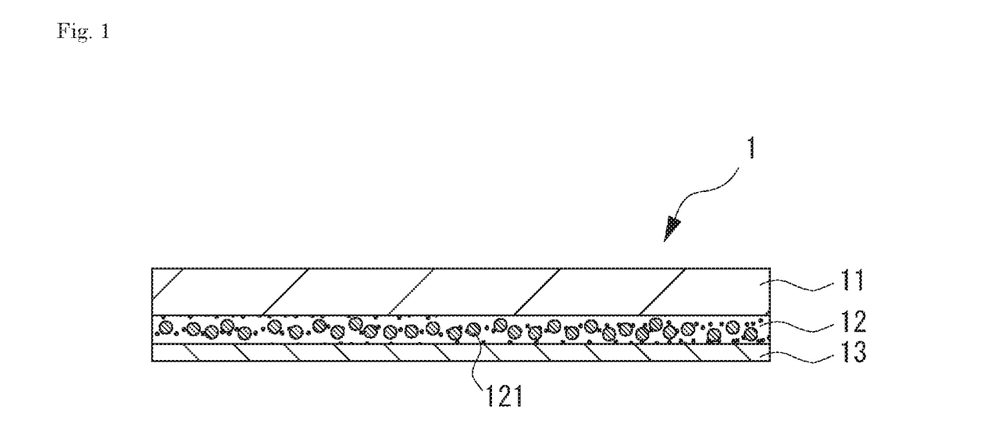
FIG. 1 is a cross-sectional view of a pressure sensitive adhesive sheet for batteries according to an embodiment of the present invention.

As illustrated in FIG. 1, a pressure sensitive adhesive sheet for batteries 1 according to an embodiment of the present invention may be composed of a base material 11, a pressure sensitive adhesive layer 12 provided on one surface side of the base material 11, and a release sheet 13 provided on the surface side of the pressure sensitive adhesive layer 12 opposite to the base material 11. In the pressure sensitive adhesive sheet for batteries 1 according to the present embodiment, the pressure sensitive adhesive layer 12 contains inorganic fine particles 121.

Here, the "pressure sensitive adhesive sheet for batteries" in the present description is a pressure sensitive adhesive sheet used at a site at which there is a possibility of contact with an electrolyte solution when manufacturing a battery. Preferably, it may be a pressure sensitive adhesive sheet used inside a battery and may also be a pressure sensitive adhesive sheet for battery interior. The battery may preferably be a nonaqueous battery. Accordingly, the electrolyte solution used in the battery may preferably be a nonaqueous electrolyte solution. The pressure sensitive adhesive sheet for batteries in the present description may preferably be a pressure sensitive adhesive sheet that is attached to a site at which there is a possibility of immersion in an electrolyte solution inside a nonaqueous battery or a site at which there is a possibility of contact with an electrolyte solution. A lithium-ion battery may be particularly preferred as the nonaqueous battery.

In the pressure sensitive adhesive sheet for batteries 1 according to the present embodiment, the pressure sensitive adhesive layer 12 contains the inorganic fine particles 121 and can thereby serve as an insulation layer. This allows the pressure sensitive adhesive sheet for batteries 1 according to the present embodiment to exhibit excellent insulation properties.

In the pressure sensitive adhesive sheet for batteries 1 according to the present embodiment, when D50 and D90 are defined as a volume-based accumulated 50% particle diameter of the inorganic fine particles 121 and a volume-based accumulated 90% particle diameter of the inorganic fine particles 121, respectively, in a particle size distribution of the inorganic fine particles 121 in the pressure sensitive adhesive layer 12, the D50 is 0.5 μm or more and 2.8 μm or less, and the ratio of the D90 to the D50 (D90/D50) is 1.3 or more and 2.0 or less. The particle size distribution is measured by image analysis on the pressure sensitive adhesive surface as an object. Details of the method of measuring the above particle size distribution are as described in the Testing Example, which will be described later.

When the above-described relationships are satisfied in the particle size distribution of the inorganic fine particles 121 in the pressure sensitive adhesive layer 12, the inorganic fine particles 121 can exist in the pressure sensitive adhesive layer 12 with a less cohesive state and in a uniformly dispersed state. As a result, the pressure-sensitive adhesive surface to be in contact with an adherend is highly smooth and can exhibit a high adhesive strength.

Moreover, when the above-described relationships are satisfied in the particle size distribution of the inorganic fine particles 121 in the pressure sensitive adhesive layer 12, the inorganic fine particles 121 exist in the pressure sensitive adhesive layer 12 in a state in which the variation of the particle size is relatively small. In such a pressure sensitive adhesive layer 12, the inorganic fine particles 121 are uniformly distributed, and also by this, the pressure sensitive adhesive sheet for batteries 1 according to the present embodiment can exhibit a high adhesive strength. Furthermore, the distribution of the inorganic fine particles 121 in the pressure sensitive adhesive layer 12 is uniform, and the variation of insulation properties in the planar view is thereby less likely to occur. This allows the pressure sensitive adhesive sheet for batteries 1 according to the present embodiment to be suppressed in the local deterioration of insulation properties in the planar view.

If the above D50 exceeds 2.8 μm, the inorganic fine particles will be in a state of forming cohesive bodies having a relatively large particle diameter in the pressure sensitive adhesive layer. This may impair the smoothness of the surface of the pressure sensitive adhesive layer, thereby to deteriorate the adhesion strength, and a portion having a low density of the inorganic fine particles may be formed to put the pressure sensitive adhesive layer into a state of having a portion in which the insulation properties are locally low. From the viewpoint, of avoiding such a problem, the above D50 may be preferably 2.4 μm or less and particularly preferably 1.4 μm or less.

On the other hand, if the above D50 is less than 0.5 μm, the pressure sensitive adhesive sheet for batteries 1 according to the present embodiment cannot achieve sufficient insulation properties. From the viewpoint of avoiding such a problem, the above D50 may be preferably 0.9 μm or more and particularly preferably 1.4 μm or more.

In addition, the above ratio (D90/D50) is 2.0 or less. If the ratio exceeds 2.0, the pressure sensitive adhesive layer will have a large variation of the insulation properties in the planar view, and local deterioration of the insulation properties cannot, be avoided in the pressure sensitive adhesive sheet for batteries which includes the pressure sensitive adhesive layer. From the viewpoint of avoiding such a problem, the above ratio (D90/D50) may be preferably 1.9 or less and particularly preferably 1.8 or less.

The value of the above ratio (D90/D50) tends to be difficult to reduce as the value of D50 decreases. In other, words, the value of the above ratio (D90/D50) tends to be difficult to reduce while maintaining a relatively small value of D50. As such, from the viewpoint of making it easy to reduce the value of D50, the above ratio (D90/D50) is 1.3 or more and may be preferably 1.4 or more and particularly preferably 1.5 or more.

The above D90 may be preferably 1.0 μm or more, particularly preferably 1.5 μm or more, and further preferably 2.3 μm or more. From another, aspect, the above D90 may be preferably 3.8 μm or less, particularly preferably 3.4 μm or less, and further preferably 2.9 μm or less. The above D90 in these ranges allows the above D50 and the above ratio (D90/D50) to be readily adjusted to the above-described respective ranges.

1. Constitutional Elements 1-1. Base Material

In the pressure sensitive adhesive sheet for batteries 1 according to the present, embodiment, the base material 11 may preferably have a high minimum voltage at which insulation breakdown, occurs. For example, the minimum voltage may be preferably 1 kV or higher, particularly preferably 2 kV or higher, and further, preferably 5 kV or higher. When the minimum voltage is 1 kV or higher, insulation breakdown of the base material 11 is less likely to occur and the reliability of the pressure sensitive adhesive sheet for batteries 1 can be higher.

The base material 11 may preferably have flame retardancy that satisfies the flame retardancy level V-0 according to the UL 94 standard. When the base material 11 has such flame retardancy, denaturation and deformation of the base material 11 can be suppressed even if the battery generates heat due to its ordinary use. Moreover, even if troubles occur in the battery and it generates excessive heat, ignition and/or burning of the base material 11 can be suppressed to prevent a serious accident.

The material of the base material 11 can be appropriately selected from the viewpoints of insulation properties, flame retardancy, heat resistance, reactivity with an electrolyte solution, permeability to an electrolyte solution, and the like. In particular, it may be preferred to use a resin film as the base material 11. Examples of the resin film include films of polyesters such as polyethylene terephthalate, polybutylene terephthalate and polyethylene naphthalate, polyolefin films such as a polyethylene film and a polypropylene film, films of a polymer that contains nitrogen m its main chain, such as a polyamide film, a polyimide film and a polyamideimide film, cellophane, a diacetyl cellulose film, a triacetyl cellulose film, an acetyl cellulose butyrate film, a polyvinyl chloride film, a polyvinylidene chloride film, a polyvinyl alcohol film, an ethylene-vinyl acetate copolymer film, a polystyrene film, a polycarbonate film, a polymethylpentene film, a polysulfone film, a polyether ether ketone film, a polyether sulfone film, a polyether imide film, a fluorine resin film, an acrylic resin film, a polyurethane resin film, a norbornene-based polymer film, a cyclic olefin-based polymer film, a cyclic conjugated diene-based polymer film, a vinyl alicyclic hydrocarbon polymer film, other resin films, and laminated films thereof. In particular, from the viewpoints of insulation properties and flame retardancy, films of a polymer that contains nitrogen in its main chain (the films may contain other components than the polymer, here and hereinafter) may be preferred, films of a polymer that has a nitrogen-containing ring structure in the main chain may be particularly preferred, and films of a polymer that has a nitrogen-containing ring structure and an aromatic ring structure in the main chain may be further preferred. Specifically, for example, a poly imide film, a polyetherimide film, or a polyether ether ketone film may be preferred, among which the polyimide film may be preferred because it is particularly excellent in the insulation properties and flame retardancy.

The thickness of the base material 11 may be preferably 5 μm or more, particularly preferably 10 μm or more, and further preferably 15 μm or more as the lower limit. When the lower limit of the thickness of the base material 11 satisfies the above, breakage of the base material 11 can be effectively suppressed even in a case in which, for example, an electrode body configured such that an electrode lead-out tab is fixed by the pressure sensitive adhesive sheet for batteries 1 is wound up and the winding pressure is applied to the pressure sensitive adhesive sheet for batteries 1. From another aspect, the thickness of the base material 11 may be preferably 200 μm or less, particularly preferably 100 μm or less, and further preferably 40 μm or less as the upper limit. When the upper limit of the thickness of the base material 11 satisfies the above, the pressure sensitive adhesive sheet for batteries 1 can have moderate flexibility and, even in a case in which the pressure sensitive adhesive sheet for batteries 1 is attached to a surface having a height difference, such as in a case in which an electrode and an electrode lead-out tab are fixed to each other, the pressure sensitive adhesive sheet for batteries 1 can well follow the height difference.

1-2. Pressure Sensitive Adhesive Layer (1) Inorganic Fine Particles

The pressure sensitive adhesive layer 12 contains a pressure sensitive adhesive component and also contains inorganic fine particles 121. The inorganic fine particles 121 are not particularly limited, provided that, in the particle size distribution of the inorganic fine particles 121 obtained by image analysis on the pressure sensitive adhesive surface, D50 and D90 obtained from the particle size distribution satisfy the previously described relationships. Examples for use include powders of calcium carbonate, aluminum hydroxide, alumina, titania, silica, boehmite, talc, iron oxide, silicon carbide, barium sulfate, boron nitride, zirconium oxide, etc., beads obtained by pelletizing them, single crystal fibers, and glass fibers. These may each be used alone and two or more types may also be used as a mixture. Among these, at least one of calcium carbonate and aluminum hydroxide may be preferably used from the viewpoints of achieving high insulation properties and readily adjusting the previously described D50 and ratio (D90/D50) to the previously described ranges.

In the inorganic fine particles 121 for use in the present embodiment, the average particle diameter may be preferably 0.01 μm or more, more preferably 0.1 μm or more, particularly preferably 0.2 μm or more, and further preferably 0.8 μm or more. From another aspect, in the inorganic fine particles 121 for use in the present embodiment, the average particle diameter may be preferably 10 μm or less, particularly preferably 5 μm or less, and further preferably 1.4 μm or less. When the average particle diameter of the inorganic fine particles 121 falls within the above range, in the particle site distribution of the inorganic fine particles 121 obtained by image analysis on the pressure sensitive adhesive surface, D50 and D90 obtained from the particle size distribution can readily satisfy the previously described relationships. The average particle diameter as used herein refers to an average particle diameter measured by a laser diffraction/scattering method for the inorganic fine particles 121 as a single substance, rather than an average particle diameter of the inorganic fine particles 121 in the pressure sensitive adhesive composition or in the pressure sensitive adhesive layer 12.

The refractive index of the inorganic fine particles 121 may be preferably 1.4 or more, particularly preferably 1.5 or more, and further preferably 1.55 or more. From another aspect, the refractive index of the inorganic fine particles 121 may be preferably 2 or less, particularly preferably 1.8 or less, and more preferably 1.7 or less. When the refractive index of the inorganic fine particles 121 falls within the above range, macroscopic observation of the pressure sensitive adhesive layer 12 allows the presence of a concentration gradient or the like of the inorganic fine particles 121 to be readily confirmed in a visual manner.

The above-described refractive index of the inorganic fine particle 121 may be measured by the following method. That is, after a sample is prepared through placing the inorganic particles 121 on a slide glass, dropping a refractive index standard solution on the inorganic particles 121, and covering them with a cover glass, the sample is observed with a microscope, and the refractive index value of the refractive index standard solution when the profile of fine particles is most difficult to see is determined as the refractive index of the inorganic fine particles 121.

The content of the inorganic fine particles 121 in the pressure sensitive adhesive layer 12 may be preferably 5 mass parts or more, particularly preferably 15 mass parts or more, and further preferably 25 mass parts or more with respect to 100 mass parts of the pressure sensitive adhesive component contained m the pressure sensitive adhesive layer 12. From another aspect, the content of the inorganic fine particles 121 in the pressure sensitive adhesive layer 12 may be preferably 500 mass parts or less, particularly preferably 250 mass parts or less, and further preferably 80 mass parts or less with respect to 100 mass parts of the pressure sensitive adhesive component contained in the pressure sensitive adhesive layer 12. When the inorganic fine particles 121 are contained m the pressure sensitive adhesive layer 12 so that the content of the inorganic fine particles 121 falls within the above-described range with respect to 100 mass parts of the pressure sensitive adhesive component contained in the pressure sensitive adhesive layer 12, the pressure sensitive adhesive sheet for batteries 1 according to the present embodiment can readily achieve the excellent insulation properties.

(2) Pressure Sensitive Adhesive Component

The pressure sensitive adhesive component contained in the pressure sensitive adhesive layer 12 is not particularly limited and can be appropriately selected from the viewpoints of solubility in an electrolyte solution, flame retardancy, heat resistance, insulation properties, and the like. In particular, it is preferred to use at least one of an acrylic-based pressure sensitive adhesive component, a silicone-based pressure sensitive adhesive component, a rubber-based pressure sensitive adhesive component, and a urethane-based pressure sensitive adhesive component as the pressure sensitive adhesive component. The pressure sensitive adhesive component contained in the pressure sensitive adhesive layer 12 may be any of an emulsion type, a solvent type, or a non-solvent type and may also be any of a crosslinked type or a non-crosslinked type. Among the above, an acrylic-based pressure sensitive adhesive component is preferred, a crosslinked-type acrylic-based pressure sensitive adhesive component is particularly preferred, and a solvent and crosslinked-type acrylic-based pressure sensitive adhesive component is further preferred, from the viewpoints of ease of fine adjustment of the adhesive strength, etc.

The above-described acrylic-based pressure sensitive adhesive component may preferably be composed of a (meth)acrylic ester polymer (A) and a crosslinker (B). In this case, the pressure sensitive adhesive layer 12 contains the acrylic-based pressure sensitive adhesive component, which is composed of the (meth)acrylic ester polymer (A) and the crosslinker (B), and the inorganic fine particles 121. Such a pressure sensitive adhesive layer 12 may preferably be formed of a pressure sensitive adhesive composition that contains the (meth)acrylic ester, polymer (A), the crosslinker (B), and the inorganic fine particles 121 (this composition may be referred to as a "pressure sensitive adhesive composition P," hereinafter).

As used in the present description, the term "(meth) acrylic ester" refers to both the acrylic ester and the methacrylic ester. The same applies to other similar terms. As used in the present description, the term "polymer" encompasses the concept of a "copolymer."

(2-1) (Meth)Acrylic Ester Polymer (A)

From the viewpoint that the pressure sensitive adhesive layer 12 can readily have a high adhesion property to an adherend, the (meth)acrylic ester polymer (A) may preferably contain (meth)acrylic alkyl ester of which the carbon number of alkyl group is 1 to 10, as the monomer unit which constitutes the polymer. Examples of such (meth)acrylic alkyl ester include methyl (meth)acrylate, ethyl (meth)acrylate, propyl (meth)acrylate, n-butyl (meth)acrylate, n-pentyl (meth)acrylate, n-hexyl (meth)acrylate, 2-ethylhexyl (meth) acrylate, isooctyl (meth)acrylate, and n-decyl (meth)acrylate. Among these, acrylic alkyl ester of which the carbon number of alkyl group is 3 to 0 is preferred, and acrylic alkyl ester of which the carbon number of alkyl group is 5 to 8 is particularly preferred. These may each be used alone and two or more types may also be used in combination.

The (meth)acrylic ester polymer (A) may preferably contain 50 mass % or more, particularly preferably 60 mass % or more, and further preferably 70 mass % or more of the (meth)acrylic alkyl ester of which the carbon number of alkyl group is 1 to 10, as the monomer unit which constitutes the polymer. When 50 mass % or more of the above (meth)acrylic alkyl ester is contained, the adhesion property to an adherend is more improved. From another aspect, the (meth)acrylic ester polymer (A) may preferably contain 99 mass % or less, particularly preferably 95 mass % or less, and further preferably 90 mass % or less of the (meth)acrylic alkyl ester of which the carbon number of alkyl group is 1 to 10, as the monomer unit which constitutes the polymer. When the content of the above (meth)acrylic alkyl ester is 99 mass % or less, an appropriate amount of other monomer, components can be introduced into the (meth)acrylic ester polymer (A).

From the viewpoint that the pressure sensitive adhesive layer 12 can readily have excellent electrolyte solution resistance, the (meth)acrylic ester polymer (A) may preferably contain (meth)acrylic alkyl ester, of which the carbon number of alkyl group is 11 to 20, as the monomer unit which constitutes the polymer. Examples of such (meth) acrylic alkyl ester include n-lauryl (meth)acrylate, myristyl (meth)acrylate, palmityl (meth)acrylate, and stearyl (meth) acrylate. Among these, (meth)acrylic alkyl ester of which the carbon number of alkyl group is 12 to 19 is preferred. These may each be used alone and two or more types may also be used in combination.

The (meth)acrylic ester polymer (A) may preferably contain 1 mass % or more, more preferably 5 mass % or more, and particularly preferably 10 mass % or more of the (meth)acrylic alkyl ester of which the carbon number of alkyl group is 11 to 20, as the monomer unit which constitutes the polymer. When the content is 1 mass % or more, the pressure sensitive adhesive layer 12 obtained can have a higher hydrophobic property, and more excellent electrolyte solution resistance can thereby be readily achieved. From another aspect, the (meth)acrylic ester polymer (A) may preferably contain 40 mass % or less, more preferably 30 mass % or less, and particularly preferably 20 mass % or less of the (meth)acrylic alkyl ester of which the carbon number of alkyl group is 11 to 20, as the monomer unit which constitutes the polymer. When 40 mass % or less of the above (meth)acrylic alkyl ester is contained, an appropriate amount of other monomer components can be readily introduced into the (meth)acrylic ester polymer (A).

If desired, the (meth)acrylic ester polymer may contain monomers other, than the above as the monomer unit which constitutes the polymer. Examples of such monomers include a monomer that contains a reactive functional group and a monomer that does not contain a reactive functional group.

Examples of the monomer which contains a reactive functional group (reactive functional group-containing monomer) include a monomer having a carboxy group m the molecule (carboxy group-containing monomer), a monomer having a hydroxyl group in the molecule (hydroxyl group-containing monomer), and a monomer having an amino group in the molecule (amino group-containing monomer). The (meth)acrylic ester polymer t A) may preferably contain the hydroxyl group-containing monomer or the carboxy group-containing monomer, among the above, as the monomer unit which constitutes the polymer, and may particularly preferably contain the carboxy group-containing monomer as the monomer unit which constitutes the polymer. When the carboxy group-containing monomer is contained, the polarity of the pressure sensitive adhesive layer 12 formed is high, and the resistance to dissolution into an electrolyte solution is more excellent.

Examples of the carboxy group-containing monomer include ethylenically unsaturated carboxylic acids such as acrylic acid, methacrylic acid, crotonic acid, maleic acid, itaconic acid, and citraconic acid. Among these, acrylic acid may be preferred. According to the acrylic acid, the above effects may be more excellent. The above carboxy group-containing monomers may each be used alone and two or more types may also be used in combination.

Examples of the hydroxyl group-containing monomer include hydroxyalkyl (meth)acrylates such as 2-hydroxyethyl (meth-acrylate, 2-hydroxypropyl (meth)acrylate, 3-hydroxypropyl (meth)acrylate, 2-hydroxybutyl (meth)acrylate, 3-hydroxybutyl. (meth)acrylate, and 4-hydroxybutyl (meth) acrylate. These may each be used alone and two or more types may also be used in combination.

Examples of the amino group-containing monomer include aminoethyl (meth)acrylate and n-butylaminoethyl (meth)acrylate. These may each be used alone and two or more types may also be used in combination.

The (meth)acrylic ester polymer (A) may preferably contain 0.5 mass % or more, particularly preferably 1 mass % or more, and further preferably 3 mass % or more of the reactive functional group-containing monomer as the monomer unit which constitutes the polymer. From another aspect, the (meth)acrylic ester polymer (A) may preferably contain 30 mass % or less, particularly preferably 20 mass % or less, and further, preferably 9 mass % or less of the reactive functional group-containing monomer as the monomer unit which constitutes the polymer. When the (meth) acrylic ester polymer (A) contains the above amount of the reactive functional group-containing monomer as the monomer unit, a cross linked structure is well formed by the reaction with the crosslinker (B) to moderately enhance the cohesive strength of the pressure sensitive adhesive layer 12 formed, and the resistance to dissolution into an electrolyte solution can thereby be more excellent.

Examples of the monomer which does not contain a reactive functional group include alkoxyalkyl (meth)acrylates such as methoxyethyl (meth)acrylate and ethoxyethyl (meth)acrylate, (meth)acrylic esters having a non-crosslinkable tertiary amino group, such as N,N-dimethylaminoethyl (meth)acrylate, N,N-dimethylaminopropyl (meth)acrylate and (meth)acryloyl morpholine, (meth)acrylamide, dimethyl acrylamide, vinyl acetate, and styrene. These may each be used alone and two or more types may also be used in combination.

The (meth)acrylic ester polymer (A) may be a polymer obtained by solution polymerization, a polymer obtained by polymerization without a solvent, or a polymer obtained by emulsion polymerization. Among these, a solution polymerization product obtained by a solution polymerization method may foe preferred. Being a solution polymerization product allows a high molecular-weight linear polymer to be easily obtained, and the pressure sensitive adhesive layer 12 can readily have more excellent electrolyte solution resistance.

The polymerization form of the (meth)acrylic ester polymer (A) may be a random copolymer and may also be a block copolymer.

The weight-average molecular weight of the (meth) acrylic ester polymer (A) may be preferably 50,000 or more, more preferably 100,000 or more, particularly preferably 200,000 or more, and further preferably 500,000 or more as the lower limit. When the lower limit of the weight-average molecular weight of the (meth)acrylic ester polymer (A) satisfies the above, the pressure sensitive adhesive layer 12 formed can have more excellent resistance to dissolution into an electrolyte solution.

From another, aspect, the weight-average molecular weight of the (meth)acrylic ester polymer (A) may be preferably 2,500,000 or less, more preferably 2,000,000 or less, particularly preferably 1,200,000 or less, and further preferably 950,000 or less as the upper limit. When the upper limit of the weight-average molecular weight of the (meth)acrylic ester polymer (A) satisfies the above, the adhesion property to an adherend can be more excellent. As used in the present description, the weight-average molecular weight refers to a standard polystyrene equivalent value that is measured using a gel permeation chromatography (GPC) method.

In the pressure sensitive adhesive composition P, one type of the (meth)acrylic ester polymer (A) may be used alone and two or more types may also be used in combination.

(2-2) Crosslinker (B)

It suffices that the crosslinker. (B) is reactive with a reactive functional group of the (meth)acrylic ester-polymer (A). Examples of the crosslinker (B) include an isocyanate-based crosslinker, an epoxy-based crosslinker, an amine-based cross linker, a melamine-based crosslinker, an aziridine-based cross linker, a hydrazine-based crosslinker, an aldehyde-based crosslinker, an oxazoline-based crosslinker, a metal alkoxide-based crosslinker, a metal chelate-based crosslinker, a metal salt-based crosslinker, and an ammonium salt-based crosslinker. One type of the crosslinker (B) may be used alone and two or more types may also be used in combination.

From the viewpoints of the reactivity with the reactive functional group of the (meth)acrylic ester polymer (A), in particular, with the carbo/y group originated from the carbo/y group-containing monomer, the electrolyte solution resistance after the reaction, the insulation properties, etc., it may be preferred to use the isocyanate-based crosslinker among the above.

The isocyanate-based crosslinker contains at least a polyisocyanate compound. Examples of the polyisocyanate compound include aromatic polyisocyanates such as tolylene diisocyanate, diphenylmethane di isocyanate and xylylene diisocyanate, aliphatic polyisocyanates such as hexamethylene diisocyanate, alicyclic polyisocyanates such as isophorone diisocyanate and hydrogenated diphenylmethane diisocyanate, biuret bodies and isocyanurate bodies thereof, and adduct bodies that are reaction products with low molecular active hydrogen-containing compounds such as ethylene glycol, propylene glycol, neopentyl glycol, trimethylol propane, and castor oil. Among these, trimethylolpropane-modified aromatic, polyisocyanate may be preferred, and trimethylolpropane-modified tolylene diisocyanate and trimethylolpropane-modified xylylene diisocyanate may be particularly preferred, from the viewpoint of reactivity with hydroxyl groups.

The content of the crosslinker (B) in the pressure sensitive adhesive composition P may be preferably 0.1 mass parts or more, particularly preferably 0.5 mass parts or more, and further preferably 1 mass part or more as the lower limit to 100 mass parts of the (meth)acrylic ester polymer (A). From another aspect, the content may be preferably 20 mass parts or less, particularly preferably 15 mass parts or less, and further preferably 10 mass parts or less as the upper limit. When the content of the crosslinker (B) falls within the above range, a cross linked structure is well formed to moderately enhance the cohesive strength of the pressure sensitive adhesive layer 12 formed, and the resistance to dissolution into an electrolyte solution can thereby be more excellent.

(2-3) Additives

If desired, the pressure sensitive adhesive composition P can contain one or more of various additives, such as a tackifier, an antioxidant, a softening agent, and a filler, which are commonly used in an acrylic-based pressure sensitive adhesive. The additives which constitute the pressure sensitive adhesive composition P are deemed not to include a polymerization solvent and a diluent solvent, which will be described later.

(3) Production of Pressure Sensitive Adhesive Composition P

The pressure sensitive adhesive composition P can be produced through producing the (meth)acrylic ester polymer (A) and adding the inorganic fine particles 121 and, if desired, the cross linker (B), additives, and the like to the (meth)acrylic ester polymer (A) obtained.

The (meth)acrylic ester polymer (A) can be produced by polymerizing a mixture of the monomers which constitute the polymer using a commonly-used radical polymerization method. Polymerization of the (meth)acrylic ester polymer (A) may preferably be carried out by a solution polymerization method, if desired, using a polymerization initiator. Note, however, that the present invention is not limited to this, and the polymerization may be carried out without a solvent. Examples of the polymerization solvent include ethyl acetate, n-butyl acetate, isobutyl acetate, toluene, acetone, hexane, and methyl ethyl ketone and two or more-types thereof may also be used in combination.

Examples of the polymerization initiator include azo-based compounds and organic peroxides and two or more types thereof may also be used in combination. Examples of the azo-based compounds include 2,2'-azobisisobutyronitrile, 2,2'-azobis(2-methylbutyronitrile), 1,1'-azobis(cyclohexane 1-carbonitrile), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis(2-hydroxymethylpropionitrile), and 2,2'-azobis[2-(2-imidazolin-2-yl) propane].

Examples of the organic peroxides include benzoyl peroxide, t-butyl perbenzoate, cumene hydroperoxide, diisopropyl peroxydicarbonate, di-n-propyl peroxydicarbonate, di(2-ethoxyethyl) peroxydicarbonate, t-butyl peroxyneodecanoate, t-butylperoxypivalate, (3,5,5-trimethylhexanoyl) peroxide, dipropionyl peroxide, and diacetyl peroxide.

The weight-average molecular weight of the polymer to be obtained can be adjusted by compounding a chain transfer agent, such as 2-mercaptoethanol, in the above polymerization step.

After the (meth)acrylic ester polymer (A) is obtained, the pressure sensitive adhesive composition P may be obtained through adding the inorganic fine particles 121 and, if desired, the crosslinker (B), additives, and the like to the solution of the (meth)acrylic ester polymer. (A) and sufficiently mixing them. The mixing at this time may preferably be performed by stirring using a mixer or the like. As a stirring condition of the stirring, the rotation speed may be set preferably to 3,000 rpm or more, particularly preferably to 6,000 rpm or more, and further preferably to 3,000 rpm or more. From another aspect, the rotation speed may be set preferably to 300,000 rpm or less, particularly preferably to 100,000 rpm or less, and further preferably to 50,000 rpm or less. The stirring time may be set preferably to 10 minutes or more, particularly preferably to 20 minutes or more, and further preferably to 30 minutes or more. From another aspect, the stirring time may be set preferably to 1,000 minutes or less, particularly preferably to 300 minutes or less, and further preferably to 60 minutes or less. By performing the stirring under such a condition, in the particle size distribution of the inorganic fine particles 121 obtained by image analysis on the pressure sensitive adhesive surface, D50 and D90 obtained from the particle size distribution may readily satisfy the previously described relationships.

For adjustment of a suitable viscosity for coating and/or adjustment of a desired film thickness of the pressure sensitive adhesive layer 12, the pressure sensitive adhesive composition P may be appropriately diluted with a diluent solvent or the like in addition to the previously described polymerization solvent to obtain a coating liquid, which will be described later. Examples of the diluent solvent include ethyl acetate, n-butyl acetate, isobutyl acetate, toluene, acetone, hexane, and methyl ethyl ketone and two or more types thereof may also be used in combination.

(4) Crosslinking of Pressure Sensitive Adhesive Composition P

When the pressure sensitive adhesive composition P contains the crosslinker (B), the pressure sensitive adhesive layer 12 can be formed by crosslinking the pressure sensitive adhesive composition P. Crosslinking of the pressure sensitive adhesive composition P can be usually carried out by heating treatment. The heating treatment can also serve as drying treatment when volatilizing the diluent, solvent and the like from the coating film of the pressure sensitive adhesive composition P applied to a desired object.

The heating temperature of the heating treatment may be preferably 50° C. to 150° C. and particularly preferably 70° C. to 120° C. The heating time may be preferably 30 seconds to 10 minutes and particularly preferably 50 seconds to 5 minutes.

After the heating treatment, if necessary, an aging period at an ordinary temperature (e.g., 23° C., 50% RH) for about 1 to 2 weeks may be provided. When the aging period is necessary, the pressure sensitive adhesive layer 12 is formed after the aging period passes, while when the aging period is not necessary, the pressure sensitive adhesive layer 12 is formed after the heating treatment is completed.

(5) Physical Properties of Pressure Sensitive Adhesive Composition

In the pressure sensitive adhesive sheet for batteries 1 according to the present, embodiment, when D50' is defined as a volume-based accumulated 50% particle diameter of the inorganic fine particles 121 in a particle size distribution of the inorganic fine particles 121 in the pressure sensitive adhesive composition, D50' may be preferably 0.1 μm or more, particularly preferably 0.5 μm or more, and further preferably 1.0 μm or more. The particle size distribution is measured by a laser diffraction/scattering method for the pressure sensitive adhesive composition as an object. The pressure sensitive adhesive composition, which contains the inorganic fine particles 121, is for forming the pressure sensitive adhesive layer 12. From another aspect, the above D50' may be preferably 2.0 μm or less, particularly preferably 1.7 μm or less, and further preferably 1.4 μm or less. When D50' falls within these ranges, D50 can readily be adjusted to the previously described ranges. The pressure sensitive adhesive composition as used herein is not limited to the previously described pressure sensitive adhesive composition P which contains the (meth)acrylic ester polymer (A), the cross linker (B), and the inorganic fine-particles 121, and refers to all pressure sensitive adhesive compositions that can be used to form the pressure sensitive adhesive layer 12 in the present embodiment.

In the pressure sensitive adhesive sheet for batteries 1 according to the present embodiment, when D90' is defined as a volume-based accumulated 90% particle diameter, of the inorganic fine particles 121 in the above-described particle size distribution measured by the laser diffraction/scattering method for the pressure sensitive adhesive composition as an object, the ratio of the D90' to the above D50' (D90'/D50') may be preferably 1.5 or more, particularly preferably 2.0 or more, and further preferably 2.5 or more. From another aspect, the ratio (D90'/D50') may be preferably 4.0 or less, particularly preferably 3.5 or less, and further preferably 3.0 or less. When the ratio (D90'/D50') falls within these ranges, the ratio (D90/D50) can readily be adjusted to the previously described ranges.

The above D90' may be preferably 0.3 μm or more, particularly preferably 1.5 μm or more, and further preferably 2.5 μm or more. From another aspect, the above D90' may be preferably 4.0 μm or less, particularly preferably 3.5 μm or less, and further preferably 3.0 μm or less. When the above D90' falls within these ranges, the above D50 and the above ratio (D90/D50) can readily be adjusted to the above-described respective ranges.

Details of the method of measuring the particle size distribution, which is measured by the laser diffraction/scattering method for the pressure sensitive adhesive composition as an object, of the inorganic fine particles 121 in the pressure sensitive adhesive composition are as described in the Testing Example, which will be described later. In the measurement of the particle size distribution by image analysis as previously described, it has been found that the range of measurable particle diameters tends to narrow as compared with the measurement of the particle size distribution by the laser, diffraction/scattering method. It has also been found, however, that when large cohesion does not occur, the values of the volume-based accumulated 50% particle diameter and accumulated 90% particle diameter are similar values even without complete matching between the two measurement methods as long as the measurable ranges are compared.

In the pressure sensitive adhesive sheet for batteries 1 according to the present embodiment, the particle gauge particle size of the inorganic fine particles 121 in the pressure sensitive adhesive composition may be preferably 20 μm or less, particularly preferably 13 μm or less, and further preferably 8 μm or less. The particle gauge particle size is measured in accordance with JIS K5600-2-5: 1999 for the pressure sensitive adhesive composition, which contains the inorganic fine particles 221, for forming the pressure sensitive adhesive layer 12. When the above particle gauge particle size is 20 μm or less, the previously described D50 and ratio (D90/D50) can readily be adjusted to the previously described respective ranges. From another aspect, the above particle gauge particle size may be preferably 1 µm or more, particularly preferably 2 µm or more, and further, preferably 3 µm or more. When the above particle gauge particle size is 1 µm or more, the pressure sensitive adhesive sheet for batteries 1 according to the present embodiment can readily achieve the excellent insulation properties. The pressure sensitive adhesive composition as used herein is not limited to the previously described pressure sensitive adhesive composition P which contains the (meth)acrylic ester polymer. (A), the crosslinker (B), and the inorganic fine particles 121, and refers to all pressure sensitive adhesive compositions chat can be used to form the pressure sensitive adhesive layer 12 in the present embodiment. Details of the method of measuring the above particle gauge particle size are as described in the Testing Example, which will be described later.

(6) Thickness of Pressure Sensitive Adhesive Layer

The thickness (a value measured in accordance with JIS K7130) of the pressure sensitive adhesive layer 12 may be preferably 1 µm or more, particularly preferably 3 µm or more, and further preferably 5 µm or more as the lower limit. When the lower limit of the thickness of the pressure sensitive adhesive layer 12 satisfies the above, the pressure sensitive adhesive sheet for batteries 1 can readily exhibit high insulation properties. From another aspect, the thickness of the pressure sensitive adhesive layer 12 may be preferably 50 µm or less, particularly preferably 20 µm or less, and further preferably 10 µm or less as the upper limit. When the upper limit of the thickness of the pressure sensitive adhesive layer 12 satisfies the above, the amount of electrolyte solution infiltrating into the pressure sensitive adhesive layer 12 from its end parts can be effectively reduced.

The thickness of the pressure sensitive adhesive layer 12 may be preferably 1.1 times or more, more preferably 5 times or more, particularly preferably 10 times or more, and further preferably 15 times or more of the average particle diameter of the inorganic fine particles 121. When the thickness of the pressure sensitive adhesive layer 12 is 1.1 times or more of the average particle diameter of the inorganic fine particles 121, in the particle size distribution of the inorganic fine particles 121 obtained by image analysis on the pressure sensitive adhesive surface, D50 and D90 obtained from the particle size distribution can readily satisfy the previously described relationships. The upper limit of the thickness ratio of the pressure sensitive adhesive layer 12 based on the average particle diameter of the inorganic fine particles 121 is not particularly limited, but may be preferably 100 times or less, more preferably 60 times or less, and particularly preferably 30 times or less.

1-3. Release Sheet

The release sheet 13 is to protect the pressure-sensitive adhesive layer 12 until the use of the pressure sensitive adhesive sheet for batteries 1 and is removed when using the pressure sensitive adhesive sheet for batteries 1. In the pressure sensitive adhesive sheet for batteries 1 according to the present embodiment, the release sheet 13 may not necessarily be required.

Examples of the release sheet 13 for use include a polyethylene film, a polypropylene film, a polybutene film, a polybutadiene film, a polymethylpentene film, a polyvinyl chloride film, a vinyl chloride copolymer film, a polyethylene terephthalate film, a polyethylene naphthalate film, a polybutylene terephthalate film, a polyurethane film, an ethylene-vinyl acetate film, an ionomer resin film, an ethylene-(meth)acrylic acid copolymer, film, an ethylene-(meth)acrylic ester copolymer film, a polystyrene film, a polycarbonate film, a polyimide film, a fluorine resin film, and a liquid crystal polymer film. Crosslinked films thereof may also be used. A laminate film obtained by laminating a plurality of such films may also be used.

It may be preferred to perform release treatment for the release surface (surface to be in contact with the pressure sensitive adhesive layer 12) of the release sheet 13. Examples of a release agent to be used for the release treatment include alkyd-based, silicone-based, fluorine-based, unsaturated polyester-based, polyolefin-based, and wax-based release agents.

The thickness of the release sheet. 13 is not particularly limited, but may be usually about 20 to 150 µm.

2. Physical Properties, Etc. Of Pressure Sensitive Adhesive Sheet for Batteries (1) Adhesive Strength The adhesive strength of the pressure sensitive adhesive sheet for batteries 1 according to the present embodiment to an aluminum plate may be preferably 0.5 N/25 mm or more and more preferably 1.0 N/25 mm or more as the lower limit. When the lower limit of the adhesive strength of the pressure sensitive adhesive sheet for batteries 1 satisfies the above, a trouble is less likely to occur that the pressure sensitive adhesive sheet for batteries 1 delaminates from an adherend (in particular, from a metal member). The upper, limit of the above adhesive strength is not particularly limited, but may be preferably 50 N/25 mm or less in general, more preferably 40 N/2.5 mm or less, particularly preferably 30 N/25 mm or less, and further preferably 5 N/25 mm or less. As used in the present description, the adhesive strength refers basically to a peel strength that is measured using a method of 180° peeling in accordance with JIS Z0237: 2009. Details of the method of measurement are as described in the Testing Example, which will be described later.

(2) Thickness of Pressure Sensitive Adhesive Sheet for Batteries

The thickness of the pressure sensitive adhesive sheet for batteries 1 (excluding the thickness of the release-sheet 13) may be preferably 10 µm or more, particularly preferably 15 µm or more, and further preferably 20 µm or more. From another aspect, the thickness of the pressure sensitive adhesive sheet for batteries 1 may be preferably 250 µm or less, particularly preferably 110 µm or less, and further preferably 45 µm or less. When the thickness of the pressure sensitive adhesive sheet for batteries 1 fails within the above range, both the excellent adhesion strength and the high insulation properties can be readily achieved.

3. Method of Manufacturing Pressure Sensitive Adhesive Sheet for Batteries

The method of manufacturing the pressure sensitive adhesive sheet for batteries 1 according to the present embodiment is not particularly 1 indeed, provided that the pressure sensitive adhesive layer 12 can be formed on one side of the base material 11. For example, the release surface of the release sheet 13 may be coated with a coating liquid that contains the previously described pressure sensitive adhesive composition b and may further contain a solvent if desired, and heating treatment may be performed to form a coating film. The coating film formed as such may be the pressure sensitive adhesive layer 12 if an aging period is not necessary. If the aging period is necessary, the formed coating film may become the pressure sensitive adhesive layer 12 after the aging period passes. Conditions for the heating treatment and aging are as previously described. Subsequently, after one surface of the base material 11 is attached to the surface of the formed pressure sensitive adhesive layer 12 opposite to the release sheet 11 and, if necessary, an aging period may be provided, the pressure sensitive adhesive sheet for batteries 1 can be obtained.

Drying treatment when volatilizing a diluent solvent and the like of the coating liquid can also serve as the above heating treatment. When performing the heating treatment, the heating temperature may be preferably 50° C. to 150° C. and particularly preferably 70° C. to 120° C. The heating time may be preferably 30 seconds to 10 minutes and particularly preferably 50 seconds to 2 minutes. After the heating treatment, if necessary, an aging period at an ordinary temperature (e.g., 23° C., 50% RH) for about 1 to 2 weeks may be provided.

Another, method of manufacturing the pressure sensitive adhesive sheet for batteries 1 according to the present embodiment may include coating the base material 11 with the pressure sensitive adhesive composition P and then forming the pressure sensitive adhesive layer 12 on the base material 11 thereby to obtain the pressure sensitive adhesive sheet for batteries 1. Coating with the pressure sensitive adhesive composition P, heating treatment, and aging in this case can be performed as in the previously described method.

In the pressure sensitive adhesive sheet for batteries 1 according to the present embodiment, it may be preferred to form the pressure sensitive adhesive layer 12 using the pressure sensitive adhesive composition P in which D50' and D90' satisfy the previously described ranges. In this case, the coating film obtained using the pressure sensitive adhesive composition P is excellent in the surface smoothness and, as a result, the pressure sensitive adhesive layer 12 obtained by drying/crosslinking the pressure sensitive adhesive composition P is also excellent in the surface smoothness. In the particle size distribution of the inorganic fine particles 121 in the pressure sensitive adhesive layer 12 measured by image analysis on the pressure sensitive adhesive surface of the pressure sensitive adhesive layer 12 as an object, D50 and D90 obtained from the particle size distribution can readily satisfy the previously described relationships. This allows the pressure sensitive adhesive sheet for batteries 1 to be manufactured with an excellent surface state of the pressure sensitive adhesive surface.

<Lithium-Ion Battery>

The lithium-ion battery according to an embodiment of the present invention may be configured such that two or more conductors are fixed in a state of being in contact with each other inside the battery using the previously described pressure sensitive adhesive sheet for batteries 1. It may be preferred that at least one of the two or more conductors be in a sheet-like shape while at least another one be in a line-lire or tape-like shape. The lithium-ion battery according to a preferred embodiment will be described below.

Figure 2:
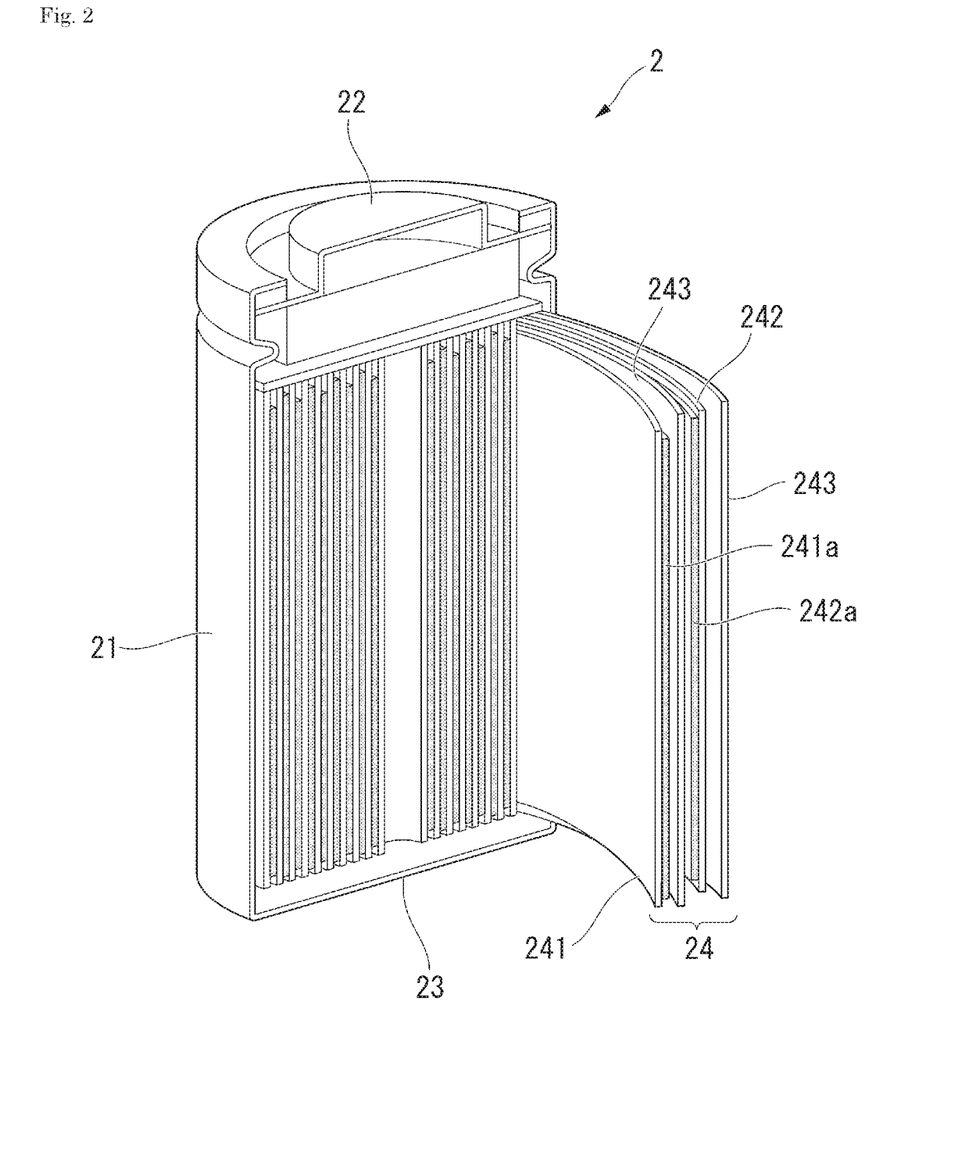
FIG. 2 is a partially cross-sectional, exploded perspective view of a lithium-ion battery according to an embodiment of the present invention.

As illustrated in FIG. 2, the lithium-ion battery 2 according to the present embodiment may include a bottomed cylindrical exterior body 21 of which the bottom part constitutes a negative electrode terminal 23, a positive electrode terminal 22 provided at an opening part of the exterior body 21, and an electrode body 24 provided inside the exterior body 21. An electrolyte solution may be enclosed in the lithium-ion battery 2.

The electrode body 24 may include a positive electrode collector 241 laminated with a positive electrode active material layer 241a, a negative electrode collector 242 laminated with a negative electrode active material layer 242a, and separators 243 interposed therebetween. The laminate of the positive electrode collector 241 and the positive electrode active material layer 241a may be referred to as a positive electrode while the laminate of the negative electrode collector 242 and the negative electrode active material layer. 242a may be referred to as a negative electrode, and the positive electrode and the negative electrode may be collectively referred to as an electrode or electrodes. The positive electrode, the negative electrode, and the separators 243 may be wound up together and then inserted inside the exterior body 21.

Figure 3:
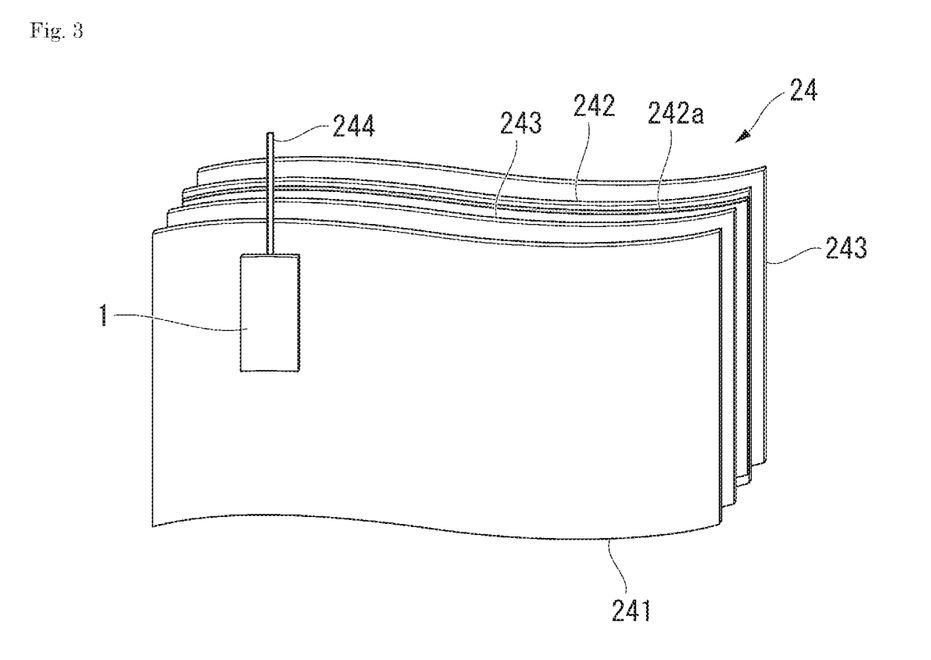
FIG. 3 is a developed, perspective view of an electrode body of the lithium-ion battery according to an embodiment of the present invention.

As illustrated in FIG. 3, a line-like or tape-like electrode lead-out tab 244 may be attached to the positive electrode collector 241 using the previously described pressure sensitive adhesive sheet for batteries 1, and the electrode lead-out tab 244 can thereby be electrically connected to the positive electrode collector 241. The electrode lead-out tab 244 may be electrically connected also to the above positive electrode terminal 22. The negative electrode collector 242 may be electrically connected to the negative electrode terminal 23 via an electrode lead-out tab which is not illustrated.

In general, the positive electrode collector 241 and the negative electrode collector 242 may be made of a material of metal such as aluminum while the electrode lead-out tab 244 may be made of a material of metal such as aluminum or copper.

The electrolyte solution used m the lithium-ion battery 2 may ordinarily be a nonaqueous electrolyte solution. Preferred examples of the nonaqueous electrolyte solution include those in which a lithium salt as the electrolyte is dissolved in a mixed solvent of a cyclic carbonate ester and a lower chain carbonate ester. Examples of the lithium salt for use include fluorine-based complex salts, such as lithium hexafluorophosphate ($LiBF_6$) and lithium borofluoride ($LiBF_4$), and $LiN(SO_2Rf)_2 \cdot LiC(SO_2Rf)_3$ (where $Rf=CF_3$, $C_2F_5$). Examples of the cyclic carbonate ester for use include ethylene carbonate and propylene carbonate. Preferred examples of the lower chain carbonate ester include dimethyl carbonate, ethyl methyl carbonate, and diethyl carbonate.

The lithium-ion battery 2 according to the present embodiment can be manufactured by an ordinary method except that the previously described pressure sensitive adhesive sheet for batteries 1 is used for fixation of the electrode lead-out tab 244.

In the lithium-ion battery 2 according to the present embodiment, the electrode lead-out tab 244 is attached to the positive electrode collector 241 using the pressure sensitive adhesive sheet for batteries 1. In the pressure sensitive adhesive sheet for batteries 1, in the particle size distribution of the inorganic fine particles 121 in the pressure sensitive adhesive layer 12 measured by image analysis on the pressure sensitive adhesive surface as an object, D50 and D90 obtained from the particle size distribution satisfy the previously described relationships. This allows the pressure sensitive adhesive sheet for batteries 1 to have an excellent surface state on the pressure sensitive adhesive surface, and the local deterioration of insulation properties is suppressed in the planar view. The pressure sensitive adhesive sheet for batteries 1 is therefore less likely to cause a trouble such as delamination from an adherend and can exhibit excellent insulation properties. As a result, the lithium-ion battery 2 according to the present embodiment can exert the excellent performance.

It should be appreciated that the embodiments heretofore explained are described to facilitate understanding of the present invention and are not described to limit the present invention. It is therefore intended that the elements disclosed m the above embodiments include all design changes and equivalents to fall within the technical scope of the present invention.

For example, in the pressure sensitive adhesive sheet for batteries 1, the release sheet 13 may be omitted. In an embodiment, the pressure sensitive adhesive sheet for batteries 1 may be provided with one or more other layers between the base material 11 and the pressure sensitive adhesive layer 12.

EXAMPLES

Hereinafter, the present invention will be described further specifically with reference to examples, etc., but the scope of the present invention is not limited to these examples, etc.

Example 1

1. Preparation of Coating Liquid of Pressure Sensitive Adhesive Composition

A (meth)acrylic ester polymer was prepared using a solution polymerisation method to copolymerize 80 mass parts of 2-ethylhexyl acrylate, 15 mass parts of lauryl methacrylate, and 5 mass parts of acrylic acid. The molecular weight of this polymer was measured using gel permeation chromatography (GPC), which will be described later. The weight-average molecular weight (Mw) was 750,000.

Then, 100 mass parts (solid content equivalent, here and hereinafter) of the obtained (meth)acrylic ester polymer and 3.72 mass parts of trimethylolpropane-modified tolylene diisocyanate (available from TOYOCHEM CO., LTD., trade name "BH38515") as an isocyanate-based crosslinker were mixed and diluted with ethyl acetate to obtain a diluted liquid having a solid concentration of 30%. The diluted liquid contains, as the pressure sensitive adhesive component, the above (meth)acrylic ester polymer and the above isocyanate-based crosslinker.

For the diluted liquid thus obtained, 27.0 mass parts of calcium carbonate fine particles (available from Konoshima Chemical Co., Ltd., product name "Calcium Carbonate Light," average particle diameter: 1.1 μm, refractive index: 1.63) were added to 100 mass parts of the above pressure sensitive adhesive component, and they were then stirred and mixed using a high-speed multi-use mixing system (available from PRIMIX Corporation, product name "LABOLUTION (registered trademark)"; product name of mixing head "NEO MIXER (registered trademark)") under a mixing condition of 10,000 rpm and 30 minutes to obtain a coating liquid of the pressure sensitive adhesive composition.

2. Formation of Pressure Sensitive Adhesive Layer

A release sheet (available from LINTEC Corporation, trade name "SP-PET251130") was prepared in which one surface of a polyethylene terephthalate film was subjected to release treatment using a silicone-based release agent. The release-treated surface of the release sheet was coated with the coating liquid of the pressure sensitive adhesive composition obtained in the above step 1 using a comma coater and the obtained coating film was dried at 120° C. for 1 minute to form a pressure sensitive adhesive layer having a thickness of 9 μm. A laminate composed of the release sheet and the pressure sensitive adhesive layer, was thus obtained.

3. Production or Pressure Sensitive Adhesive Sheet for Batteries

The surface of the laminate, obtained in the above step 2, on the side of the pressure sensitive adhesive layer and one surface of a polyimide film (available from DU PONT-TORAY CO., LTD., product name "Kapton 100H," thickness: 25 μm, flame retardation level according to UL94 standard: V-0) as a base material were attached to each other and they were then aged at 23° C. and 50% RH for 7 days 1.0 to obtain a pressure sensitive adhesive sheet for batteries in which the base material, the pressure sensitive adhesive layer, and the release sheet were laminated in this order.

Here, the previously described weight-average molecular weight (Mw) refers to a weight-average molecular weight that is measured as a standard polystyrene equivalent value under the following condition using gel permeation chromatography (GPC) (GPC measurement).

<Measurement Condition>

GPC measurement apparatus: HLC-8320 available from Tosoh Corporation

GPC columns (passing through in the following order): available from Tosoh Corporation TSK gel super H-H
TSK gel super HM-H
TSK gel super H2000
Solvent for measurement: tetrahydrofuran
Measurement temperature: 40° C.

Example 2

A pressure sensitive adhesive sheet for batteries was manufactured in the same manner as in Example 1 except that the type and additive amount of the inorganic fine particles were changed as listed in Table 1.

Comparative Example 1

A pressure sensitive adhesive sheet for batteries was manufactured in the s a rue manner as in Example 1 except that the mixing head of the high-speed multi-use mixing system used for mixing after addition of the inorganic fine particles was changed to the product name "HOMOGENIZING DISPER" available from PRIMIX Corporation and the mixing condition was changed as listed in Table 1.

Comparative Example 2

A pressure sensitive adhesive sheet for batteries was manufactured in the same manner as in Example 1 except that 1.5 the type and additive amount of the inorganic fine particles were changed as listed in Table 1, the mixing head of the high-speed multi-use mixing system used for mixing after addition of the inorganic fine particles was changed to the product name "HOMOGENIZING DISPER" available from PRIMIX Corporation, and the mixing condition was changed as listed in Table 1.

Comparative Example 3

A pressure sensitive adhesive sheer, for batteries was manufactured in the same manner as in Example 1 except that no inorganic fine particles were added and a coating liquid of a pressure sensitive adhesive composition prepared without performing the previously described mixing was used.

<Testing Example 1> (Measurement of Particle Size Distribution by Image Analysis)

The release sheet was removed from the pressure sensitive adhesive sheet for batteries obtained in each of Examples 1 and 2 and Comparative Examples 1 and 2. For the exposed surface of the exposed pressure sensitive adhesive layer, the surface image was acquired at a magnification ratio of 2,000 using a scanning electron microscope (available from KEYENCE CORPORATION, product name "VE-9800"). At that time, the brightness was set to "0" and the contrast was sec to "1600."

For the obtained surface image, measurement analysis of the particle size distribution of the inorganic fine-particles contained in the pressure sensitive adhesive layer was performed using image analysis software (available from Mountech Co., Ltd., product name: "Mac-View"). At that time, the particle diameter of the inorganic fine particles was measured as the Heywood diameter (the particle diameter when the projected area of each particle was converted into a circle), the analysis condition was set to analysis by a "complex shape," the detection sensitivity was set to "20," the detection accuracy was set to "0.7" (even small particles were detected), and the low-cut processing luminance was set to "140 or less."

From the particle size distribution obtained as the above, the volume-based accumulated 50% particle diameter (D50) and the volume-based accumulated 90% particle diameter (D90) were specified. Furthermore, the ratio of the D90 to the D50 (D90/D50) was calculated. These results are listed in Table 1.

<Testing Example 2> (Measurement of Particle Size Distribution by Laser Diffraction/Scattering Method)

For the coating liquid of the pressure sensitive adhesive composition ion prepared when manufacturing the pressure sensitive adhesive sheet for batteries according to each of Examples 1 and 2 and Comparative Examples 1 and 2, measurement analysis of the particle size distribution of the inorganic fine particles contained was performed using a laser diffraction particle size analyzer (available from Malvern Panalytical Ltd, product name "Mastersizer"). From the particle size distribution thus obtained, the volume-based accumulated 50% particle diameter (D50') and the volume-based accumulated 90% particle diameter (D90') were specified. Furthermore, the ratio of the D90' to the D50' (D90'/D50') was calculated. These results are listed in Table 1.

<Testing Example 3> (Measurement of Particle Gauge Particle Size)

For the coating liquid of the pressure sensitive adhesive composition prepared when manufacturing the pressure sensitive adhesive sheet for batteries according to each of Examples 1 and 2 and Comparative Examples 1 and 2, the particle gauge particle size was measured in accordance with JIS K 5600-2-5: 1999 using a grind meter (available from TESTEP SANGYO CO., LTD., product name "PI-901 Particle Size Meter," measurement range 0 to 50 μm). Results are listed in Table 1.

<Testing Example 4> (Measurement of Adhesive Strength)

The adhesive strength of the pressure sensitive adhesive sheets for batteries in this Testing Example was measured in accordance with JIS Z0237: 2009 except the following operation.

The pressure sensitive adhesive sheet for batteries obtained in each of Examples and Comparative Examples was out into a width of 25 mm and a length of 250 mm and the release sheet was then removed to obtain a test piece. The exposed pressure sensitive adhesive layer of the test piece was attached to an aluminum plate as an adherend using a rubber roller of 2 kg under an environment of 23° C. and 50% RH. Immediately thereafter, the test piece was peeled off from the above aluminum plate at a peel angle of 180° and a peel speed of 300 mm/min using a universal tensile tester (available from ORIENTEC Co., LTD., product name "TENSILON UTM-4-100"; and the adhesive strength (N/25 mm) was thus measured. Results are listed in Table 1.

<Testing Example 5> (Evaluation of Coating Properties)

For the coating film obtained by coating the release-treated surface of the release sheet with the coating liquid of the pressure sensitive adhesive composition when manufacturing the pressure sensitive adhesive sheet for batteries according to each of Examples and Comparative Examples, the surface condition of the surface opposite to the release sheet was visually observed, and the coating properties of the pressure sensitive adhesive composition was evaluated on the basis of the following criteria. Results are listed in Table 1.

o: No granular or streak-like shape exists and a uniform surface state was obtained.

x: A granular or streak-like shape occurred.

<Testing Example 6> (Evaluation of Insulating Properties)

After the pressure sensitive adhesive sheet for batteries obtained in each of Examples and Comparative Examples was cut into a size of 10 mm×10 mm, the release sheet was removed and the exposed surface of the exposed pressure sensitive adhesive layer was attached to one surface of an aluminum plate of 1 cm×1 cm to obtain a test piece. Subsequently, the test piece was heated in a nitrogen atmosphere at 800° C. for 1 hour.

For the test piece after, heating, the resistance value ($\Omega$) was measured at any one point in the planar, view of the pressure sensitive adhesive sheet using the Digital HiTester (available from HIOKI E.E. CORPORATION, product name "3802-50"). Furthermore, the measurement was repeated times in total while varying the position to be measured. Thus, the resistance values of the pressure sensitive adhesive sheet for batteries in its thickness direction were obtained at arbitrary ten points in the planar, view.

Subsequently, the number of points of $1.0 \times 10^{10} \Omega$ or more was counted among the ten measurement results. Results are listed in Table 1. Furthermore, the insulation properties of the pressure sensitive adhesive sheet for batteries were evaluated in accordance with the following criteria on the basis of the number of points with the resistance values of $10.0 \times 10^{10} \Omega$ or more.

o: The number of points with the resistance values of $1.0 \times 10^{10} \Omega$ or more was 10.

x: The number of points with the resistance values of $1.0 \times 10^{10} \Omega$ or more was 9 or less.

Details of the simplified names listed in Table 1 and additional information are as follows.

<Inorganic Fine Particles>

Calcium carbonate: Calcium carbonate fine particles (available from Konoshima Chemical Co., Ltd., product name "Calcium Carbonate Light," average particle diameter: 1.1 μm, refractive index: 1.69)

Aluminum hydroxide: Aluminum hydroxide fine particles (available from Nippon Light Metal Co., Ltd., product name "BF013," average particle diameter: 1.2 μm, refractive index: 1.57)

TABLE 1

| | Inorganic fine particles | | | | Particle size distribution by image analysis | | |
|---|---|---|---|---|---|---|---|
| | Type | Average particle diameter (µm) | Additive amount (mass parts) | Mixing condition | D50 (µm) | D90 (µm) | D90/D50 |
| Example 1 | Calcium carbonate | 1.1 | 27.5 | 10,000 rpm | 1.5 | 2.5 | 1.66 |
| Example 2 | Aluminum hydroxide | 1.2 | 55 | 30 minutes | 1.7 | 2.8 | 1.59 |
| Comparative Example 1 | Calcium carbonate | 1.1 | 27.5 | 2,000 rpm | 2.9 | 4.0 | 1.37 |
| Comparative Example 2 | Aluminum hydroxide | 1.2 | 55 | 30 minutes | 3.1 | 4.3 | 1.38 |
| Comparative Example 3 | — | — | — | — | — | — | — |

| | Particle size distribution by laser diffraction/scattering method | | | Particle gauge particle size | Adhesive strength (N/25 mm) | Evaluation of insulation properties | | |
|---|---|---|---|---|---|---|---|---|
| | D50 (µm) | D90 (µm) | D90/D50 | | | Evaluation of coating properties | Counting result (point) | Evaluation |
| Example 1 | 1.1 | 3.1 | 2.80 | 5 | 1.3 | ○ | 10 | ○ |
| Example 2 | 1.2 | 3.3 | 2.75 | 5 | 1.3 | ○ | 10 | ○ |
| Comparative Example 1 | 1.8 | 9.8 | 5.44 | 25 | 0.9 | X | 9 | X |
| Comparative Example 2 | 2.2 | 10.5 | 4.54 | 25 | 0.9 | X | 8 | X |
| Comparative Example 3 | — | — | — | — | 2.8 | ○ | 0 | X |

As apparent from Table 1, the pressure sensitive adhesive sheets for batteries of Examples are excellent in the coating properties of the pressure sensitive adhesive composition when forming the pressure sensitive adhesive layer. Moreover, the pressure sensitive adhesive sheets for batteries of Examples have a large adhesive strength, do not have a portion in which the insulation properties are locally deteriorated, and exhibit excellent insulation properties.

INDUSTRIAL APPLICABILITY

The pressure sensitive adhesive composition and the pressure sensitive adhesive sheet for batteries according to the present invention are suitable for use inside a lithium-ion battery and, in particular, suitable for attaching an electrode lead-out tab to an electrode.

DESCRIPTION OF REFERENCE NUMERALS

1 . . . Pressure sensitive adhesive sheet for batteries
11 . . . Base material
12 . . . Pressure sensitive adhesive layer
121 . . . Inorganic fine particles
13 . . . Release sheet
2 . . . Lithium-ion battery
21 . . . Exterior body
22 . . . Positive electrode terminal
23 . . . Negative electrode terminal
24 . . . Electrode body
241 . . . Positive electrode collector
241a . . . Positive electrode active material layer
242 . . . Negative electrode collector
242a . . . Negative electrode active material layer
243 . . . Separator
244 . . . Electrode lead-out tab

The invention claimed is:

1. A pressure sensitive adhesive sheet for batteries, comprising:
a base material; and
a pressure sensitive adhesive layer provided on one surface side of the base material and containing inorganic fine particles,
wherein an average particle diameter of the inorganic fine particles is 0.8 µm or more and 10 µm or less,
wherein when D50 and D90 are defined as a volume-based accumulated 50% particle diameter of the inorganic fine particles and a volume-based accumulated 90% particle diameter of the inorganic fine particles, respectively, in a particle size distribution of the inorganic fine particles in the pressure sensitive adhesive layer,
the D50 is 0.5 µm or more and 2.8 µm or less, and
a ratio of the D90 to the D50 (D90/D50) is 1.3 or more and 2.0 or less,
wherein the particle size distribution is measured by image analysis on a surface of the pressure sensitive adhesive layer opposite to the base material.

2. The pressure sensitive adhesive sheet for batteries as recited in claim 1, wherein the D90 is 1.0 µm or more and 3.8 µm or less.

3. The pressure sensitive adhesive sheet for batteries as recited in claim 1, wherein a thickness of the pressure sensitive adhesive layer is 1 µm or more and 50 µm or less.

4. The pressure sensitive adhesive sheet for batteries as recited in claim 1, wherein an adhesive strength of the pressure sensitive adhesive sheet for batteries to an aluminum plate is 0.5 N/25 mm or more and 50 N/25 mm or less.

5. A pressure sensitive adhesive sheet for batteries, comprising:
a base material; and
a pressure sensitive adhesive layer provided on one surface side of the base material and containing inorganic fine particles,
wherein an average particle diameter of the inorganic fine particles is 0.8 µm or more and 10 µm or less,
wherein the pressure sensitive adhesive layer is formed of a pressure sensitive adhesive composition containing the inorganic fine particles,
wherein when D50' and D90' are defined as a volume-based accumulated 50% particle diameter of the inorganic fine particles and a volume-based accumulated 90% particle diameter of the inorganic fine particles, respectively, in a particle size distribution of the inorganic fine particles in the pressure sensitive adhesive composition, the D50' is 0.1 μm or more and 2.0 μm or less, and
a ratio of the D90' to the D50' (D90'/D50') is 1.5 or more and 4.0 or less,
wherein the particle size distribution is measured by a laser diffraction/scattering method.

6. The pressure sensitive adhesive sheet for batteries as recited in claim 5, wherein a particle gauge particle size of the inorganic fine particles in the pressure sensitive adhesive composition is 1 μm or more and 20 μm or less, wherein the particle gauge particle size is measured in accordance with BS K5600-2-5: 1999.

7. A lithium-ion battery in which two or more conductors are fixed in a state of being in contact with each other inside the battery using a pressure sensitive adhesive sheet, wherein:
the pressure sensitive adhesive sheet comprises a base material and a pressure sensitive adhesive layer provided on one surface side of the base material,
the pressure sensitive adhesive layer contains inorganic fine particles,
an average particle diameter of the inorganic fine particles is 0.8 μm or more and 10 μm or less, and
when D50 and D90 are defined as a volume-based accumulated 50% particle diameter of the inorganic fine particles and a volume-based accumulated 90% particle diameter of the inorganic fine particles, respectively, in a particle size distribution of the inorganic fine particles in the pressure sensitive adhesive layer:
D50 is 0.5 μm or more and 2.8 μm or less, and
a ratio of D90 to D50 (D90/D50) is 1.3 or more and 2.0 or less, and
the particle size distribution is measured by image analysis on a surface of the pressure sensitive adhesive layer opposite to the base material.

8. A lithium-ion battery in which two or more conductors are fixed in a state of being in contact with each other inside the battery using a pressure sensitive adhesive sheet, wherein:
the pressure sensitive adhesive sheet comprises a base material and a pressure sensitive adhesive layer provided on one surface side of the base material,
the pressure sensitive adhesive layer is formed of a pressure sensitive adhesive composition containing an inorganic fine particles,
an average particle diameter of the inorganic fine particles is 0.8 μm or more and 10 μm or less, and
when D50' and D90' are defined as a volume-based accumulated 50% particle diameter of the inorganic fine particles and a volume-based accumulated 90% particle diameter of the inorganic fine particles, respectively, in a particle size distribution of the inorganic fine particles in the pressure sensitive adhesive composition:
D50' is 0.1 μm or more and 2.0 μm or less, and
a ratio of D90' to D50' (D90'/D50') is 1.5 or more and 4.0 or less, and
the particle size distribution is measured by a laser diffraction/scattering method.

9. The pressure sensitive adhesive sheet for batteries as recited in claim 7,
wherein the D90 is 1.0 μm or more and 3.8 μm or less.

10. The pressure sensitive adhesive sheet for batteries as recited in claim 7, wherein a thickness of the pressure sensitive adhesive layer is 1 μm or more and 50 μm or less.

11. The pressure sensitive adhesive sheet for batteries as recited in claim 7, wherein an adhesive strength of the pressure sensitive adhesive sheet for batteries to an aluminum plate is 0.5 N/25 mm or more and 50 N/25 mm or less.

12. The pressure sensitive adhesive sheet for batteries as recited in claim 8, wherein a particle gauge particle size of the inorganic fine particles in the pressure sensitive adhesive composition is 1 μm or more and 20 μm or less, wherein the particle gauge particle size is measured in accordance with JIS K5600-2-5: 1999.

* * * * *